M. C. J. BANNISTER.
APPARATUS FOR PRODUCING BLOCKS OR COATINGS OF ICE.
APPLICATION FILED AUG. 22, 1910.

1,013,470.

Patented Jan. 2, 1912.

2 SHEETS—SHEET 1.

Witnesses
James B. Mansfield
L. E. Witham

Inventor
Maunsel C. J. Bannister
By Alexander Powell

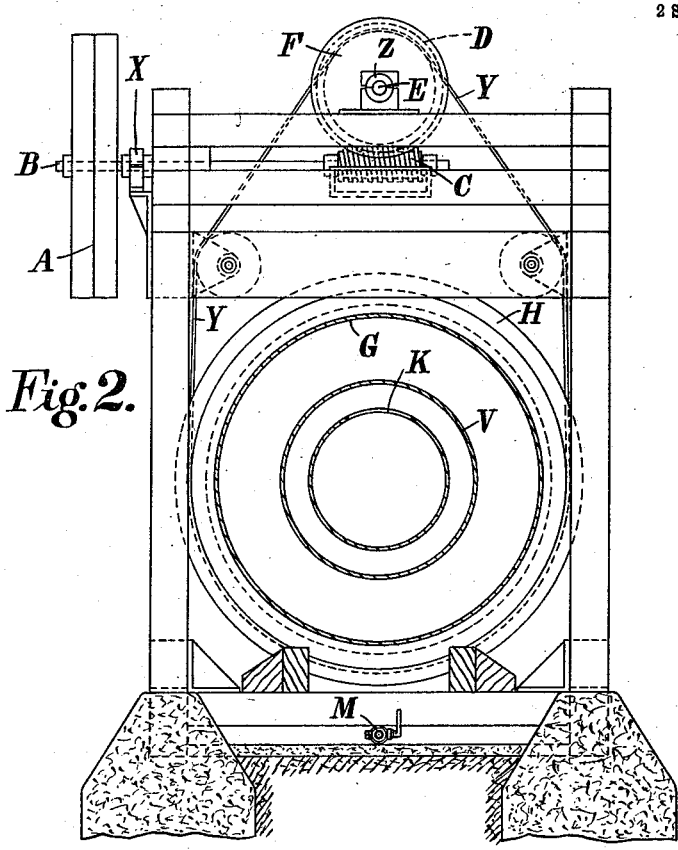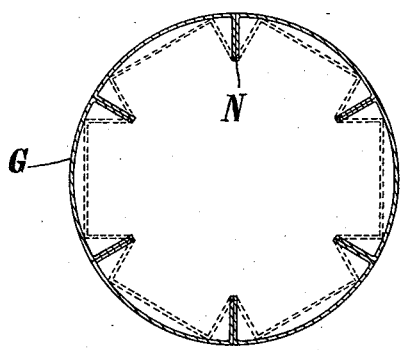

UNITED STATES PATENT OFFICE.

MAUNSEL CASWELL JOHN BANNISTER, OF DUBLIN, IRELAND.

APPARATUS FOR PRODUCING BLOCKS OR COATINGS OF ICE.

1,013,470. Specification of Letters Patent. Patented Jan. 2, 1912.

Application filed August 22, 1910. Serial No. 578,445.

*To all whom it may concern:*

Be it known that I, MAUNSEL CASWELL JOHN BANNISTER, a subject of the King of Great Britain, residing at Dublin, Ireland, have invented certain new and useful Improvements in Apparatus for Producing Blocks or Coatings of Ice, of which the following is a specification.

This invention relates to refrigerating apparatus of the type in which a revolving or oscillating member brings a series of troughs or articles on the surface of which the ice forms, hereinafter spoken of by the English trade name of "baits," alternately into and out of water which is to be frozen on to the said surface.

It is the object of the present invention to provide an improved apparatus which will be compact and simple in structure, and will enable ice to be formed rapidly in a very effectual manner in a revolving or oscillating drum or series of troughs.

The invention is illustrated in the accompanying drawings in which:—

Figure 1:
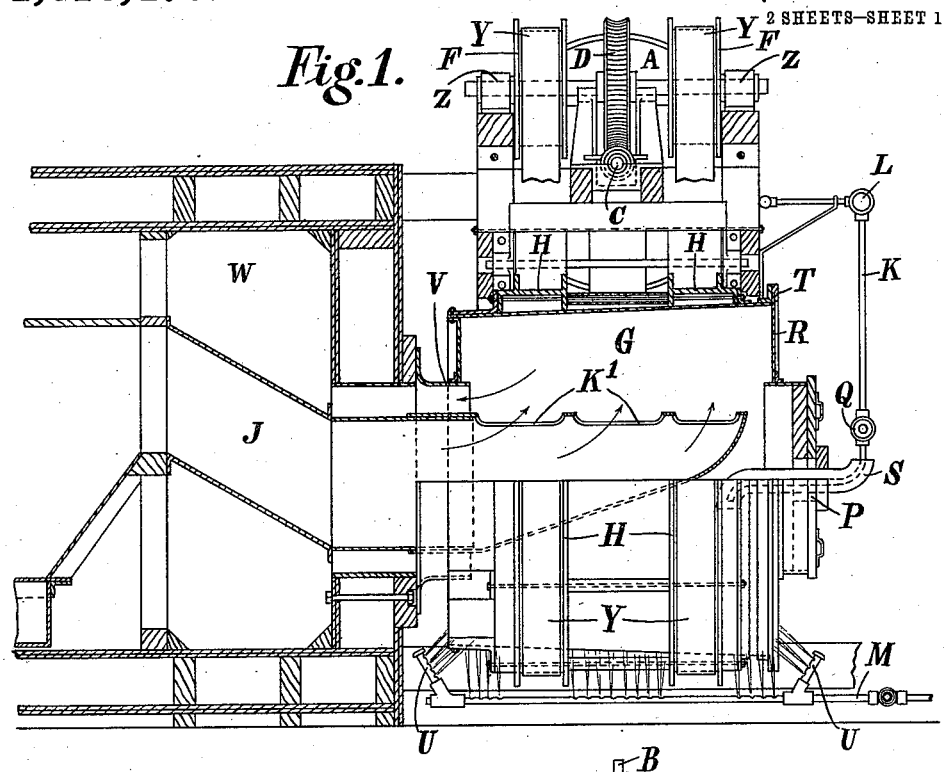
Figure 3:
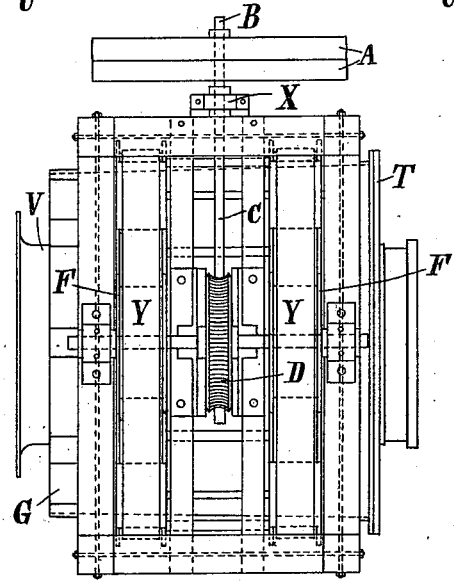

Figure 1 shows the apparatus in side elevation partly in section; Fig. 2 shows a partial end view; Fig. 3 shows a partial plan view; Fig. 4 is a sectional view showing a modification.

In these drawings, A, Fig. 2, is the driving pulley fixed on a shaft B supported in suitable bearings such as X. This shaft carries a worm C which gears with a worm wheel D on a shaft E. The shaft E is supported in suitable bearings such as Z and carries two belt pulleys F.

G is the hollow bait or drum of cylindrical or slightly conical form, having on its outer circumference two pulleys or belt tracks H. The bait G is hung from the pulleys F by continuous belts or slings Y which are passed around the pulleys H on the bait.

W, Fig. 1, represents part of an apparatus of a known kind for cooling the air down to a very low temperature and supplying it through a pipe or duct J to the interior of the bait G. The duct J ends in a perforated part K¹ inside the bait G and the refrigerated air supplied through the duct J passes out through the perforations in K¹ into the interior of the bait G, and flows back to the apparatus W through a hollow trunnion V at the left end of the bait G. Cold water which may have been cooled down nearly to freezing point in any suitable known apparatus is supplied to the interior of the bait through a pipe K which is supported at the top by a pivoting joint L of known kind to allow the pipe K to be moved. The flow of water can be controlled by a cock Q near the bottom of the pipe K, and the end piece S of the pipe, which is carried into the bait G through an opening P at the right hand side, is preferably lagged as indicated in Fig. 1 to prevent the water from freezing in the end piece S.

The end R of the bait G is removable to allow of the removal of the frozen block from the interior of the bait. The end R is held in place by means of any suitable clamp such as T at the edge of the bait.

M is a pipe for supplying heated water. This pipe has projecting pieces U, and the pipe itself and these projecting pieces are perforated to allow jets of warm water to be sprayed as indicated in Fig. 1 upon the outer surface of the bait drum G. The object of this is to enable the block of ice when complete to be thawed around its circumference in the bait so that it will slip out easily from the bait drum when the end R is removed.

The mode of operation is as follows:— The shafts being set in motion the two belts on pulleys F F H H cause the bait drum G to revolve without any sudden shaking. The cold water is allowed to enter by the conduit K either intermittently or continuously, being regulated by the cock Q. The cold air is put in circulation, and as the bait G revolves, it carries up a film of cold water which gradually gets congealed by the cold atmosphere to a point considerably below freezing point; as the surface descends into the water again an additional layer freezes on to it, and at the same time another additional layer of liquid water is carried up which in turn is frozen by the cold air; this action goes on until the hollow bait G is sufficiently full of ice, when the air is shut off, and the hot water jets on the pipe M are brought into action, and the end R of the bait drum is removed bodily, the water pipe K having first been swung out of place around its joint L. The mass of ice is now withdrawn from the bait drum G and sawed up into the required pieces; the cover R is reapplied, and a fresh cycle of operations is carried on.

The speed of the drum and quantity of water admitted at start and gradually afterward can be varied within very wide limits. In my experiments I have sometimes put in all the water at once and sometimes have run it in in a small continuous trickle, or at various intermediate speeds. I have also run the drum G very slowly, i. e. at less than one revolution a minute, or fast and at such speeds as shall cause the water by centrifugal force to form an approximately even layer all over the inner periphery of the bait. Where quantity is the desideratum a speed of only a few revolutions a minute and sufficient water to always present a wet surface all over to the air is preferable, but where quality of clear transparency is required, very high speed and a limited quantity of water are preferable, or a considerable amount of water and moderate speed and the action stopped as soon as rough ice begins to form.

I have hitherto spoken of a simple drum but my experiments indicate that it would be better in some cases to divide it into a series of troughs by radial plates which can be taken out with the ice. If these radial plates be smooth they can with a little heat be thawed off from the ice and put back into the drum, or the drum can be formed of a series of shallow troughs but the cost of undoing and reassembling it each time in this latter case would be serious. Fig. 4 shows a drum G divided by partitions N into a number of separate troughs. I may also arrange the circulation of the drum to be semi or partially rotary to avoid the falling of drip from the upper to the lower part or place an intercepter to catch such drip.

I declare that what I claim is:—

1. In a refrigerating apparatus, the combination of a bait drum formed with a plurality of pulleys on its outside, belts surrounding said pulleys, and belt pulleys with means for supporting them above the bait drum for the purpose of carrying the belts and the bait drum, means for driving the belt pulleys for the purpose of turning the bait drum, means for supplying a stream of refrigerated air to the interior of the bait drum and means for supplying water to the interior of the bait drum.

2. In a refrigerating apparatus, the combination of a bait drum and means for turning the same, means for supplying refrigerated air and a duct terminating inside the bait drum adapted to discharge the refrigerated air therein, a hollow end piece on the bait drum through which the said duct passes, the said end piece being larger than the duct whereby an outflow passage is provided for the air, and means for supplying cold water to the interior of the bait drum.

3. In a refrigerating apparatus, the combination of a bait drum and means for turning same, means for supplying refrigerated air to the interior of the bait drum, a pipe for supplying cold water to the interior of the bait drum, an end piece on said pipe passing through an opening in the end of the bait drum, and means for controlling the rate of flow of the water to the interior of the bait drum.

4. In a refrigerating apparatus for making ice, the combination of a hollow round bait, means for turning said bait about its horizontal axis, means for supplying a stream of artificially cooled air through the interior of the bait, and means for supplying the water to the interior of the bait; whereby as the bait turns, the water flows over the surface and every part successively is submerged and exposed to the refrigerating current.

5. In a refrigerating apparatus for making ice, the combination of a cylindrical bait, means for turning said bait upon its axis, means for supplying a stream of freezing air into the interior of the bait, means for supplying cold water to the interior of the bait only and means for externally heating said bait when required, whereby the frozen block may be released from the interior of the bait to facilitate the removal thereof.

6. In refrigerating apparatus, the combination of a hollow bait with partitions therein dividing it internally into a number of separate troughs, means for supporting the bait on flexible connections and of turning it on its axis thereon, whereby all jerking and sudden shocks are avoided, means for supplying cooled air and water to the interior of the bait, substantially as described.

In witness whereof, I have hereunto signed my name this 11th day of August, 1910, in the presence of two subscribing witnesses.

MAUNSEL CASWELL JOHN BANNISTER.

Witnesses:
 ROBERT WOODS,
 HUGH MONAN.